H. H. FITCH AND E. W. MILLER.
HUB APPLIANCE FOR MOTOR VEHICLES.
APPLICATION FILED APR. 10, 1920.

1,406,836.

Patented Feb. 14, 1922.

H. H. Fitch
E. W. Miller
INVENTOR

BY Victor J. Evans
ATTORNEY

WITNESS:

UNITED STATES PATENT OFFICE.

HARRY H. FITCH AND ERNEST W. MILLER, OF ORANGE, VIRGINIA.

HUB APPLIANCE FOR MOTOR VEHICLES.

1,406,836. Specification of Letters Patent. Patented Feb. 14, 1922.

Application filed April 10, 1920. Serial No. 372,881.

*To all whom it may concern:*

Be it known that we, HARRY H. FITCH and ERNEST W. MILLER, citizens of the United States, residing at Orange, in the county of Orange and State of Virginia, have invented new and useful Improvements in Hub Appliances for Motor Vehicles, of which the following is a specification.

The present invention has reference to an emergency appliance for vehicles, and is designed for use especially upon the driving wheel of an ordinary Ford car when the hub thereof is injured or broken, to permit of the proper driving of the vehicle until the injured parts thereof have been repaired.

A further object is to produce an emergency appliance for this purpose which is of an extremely simple construction, cheaply manufactured, easily applied, and thoroughly efficient for the purpose for which it is devised.

In the drawings:—

Figure 1:
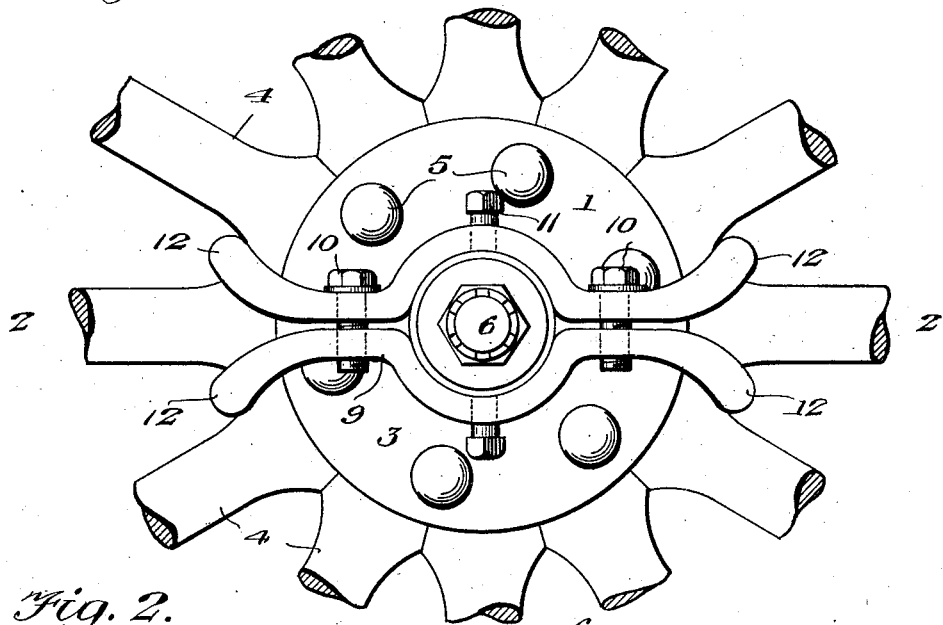
Figure 1 is a view in elevation illustrating the application of the improvement.
Figure 2:
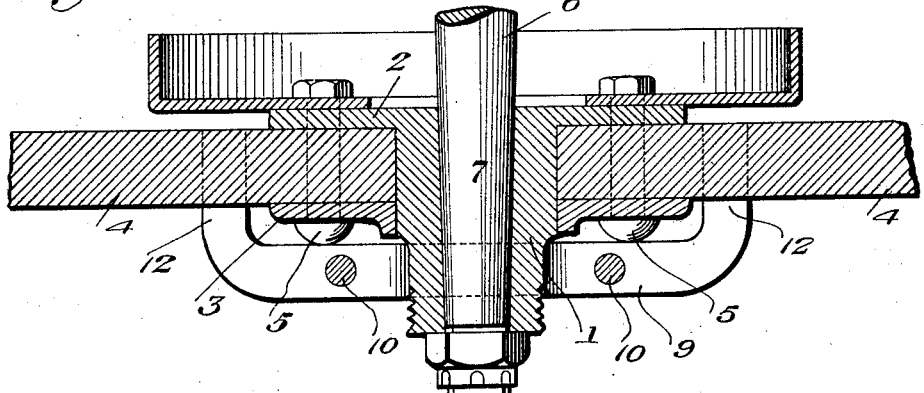
Figure 2 is a sectional view approximately on the line 2—2 of Figure 1.
Figure 3:
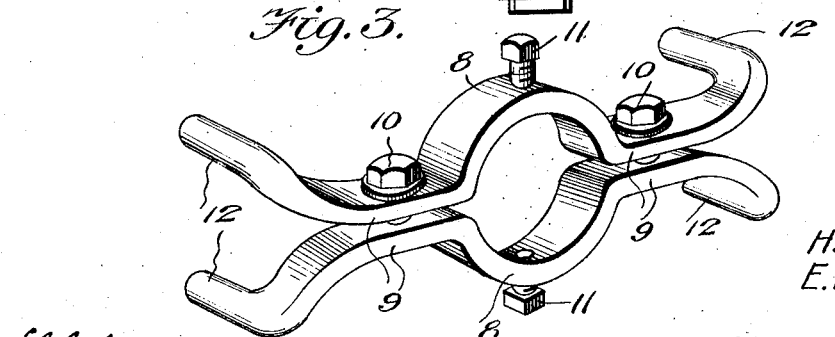
Figure 3 is a perspective view of the improvement detached.

In the drawings a hub of the ordinary type employed in connection with the rear or driving wheel of a Ford automobile is indicated by the numeral 1. The rear hub flange or plate is indicated by the numeral 2, while 3 denotes the outer removable hub plate or flange. The wheel spokes 4 are secured between the plates or valves 2 and 3 by the bolts 5 that connect the said plates or flanges. The drive axle 6 has its spindle 7 passing through the hub 1 and keyed thereto in the usual manner.

Our improvement is of particular advantage in the event of the hub plate 2 becoming broken or otherwise unfit for use, as the said plate is integrally formed with the hub, while the outer flange 3 is loose on the hub. In the event of the breakage of the said plate or flange 2, we arrange our improvement over the outer end of the hub and clamp the same thereto in a manner to retain the improvement rigid on the hub, while the finger elements of our improvement are disposed to engage with the opposite sides of certain of the spokes and thus lock the wheel to the hub.

Our improvement comprises two similar members each constructed of metal or some other suitable hardened material, and each being in the nature of a plate that has a central outwardly rounded portion 8. The straight portions 9 extending over the ends of the rounded portions 8 have aligning openings therethrough which are threaded, and through these openings are passed the threaded shanks of bolts 10. These bolts 10 bring the straight portions of the plates toward each other so that the rounded portions thereof will grip on the hub. The rounded portions have threaded openings therethrough which receive therethrough binding screws 11 that contact with the opposite sides of the hub to effect in retaining the device on the hub. The straight portions 9, at their outer ends are offset away from each other and provided with angle extensions in the nature of fingers 12, and each pair of fingers is designed to embrace one of the spokes 4 of the wheel.

It is thought that the foregoing description, when taken in connection with the drawings will fully set forth the simplicity of the construction and the advantages thereof.

Having thus described the invention, what we claim is:—

An emergency appliance for the purpose herein set forth, including two similarly constructed members each having a central outwardly rounded portion, binding elements carried by each of the rounded portions, binding elements between the straight portions outward of the rounded portions, said straight portions having their outer ends extended angularly away from each other and terminating each in a finger at right angles to the plane of the other portions, all as and for the purpose set forth.

In testimony whereof we affix our signatures.

HARRY H. FITCH.
ERNEST W. MILLER.